(12) United States Patent
Li

(10) Patent No.: US 6,785,846 B2
(45) Date of Patent: Aug. 31, 2004

(54) INEXPENSIVE METHOD FOR DIAGNOSING MANUFACTURING DEFECTS IN AN EMBEDDED SYSTEM

(75) Inventor: Ming Y. Li, Mahwah, NJ (US)

(73) Assignee: Intel Corporation, Santa Clara, CA (US)

( * ) Notice: Subject to any disclaimer, the term of this patent is extended or adjusted under 35 U.S.C. 154(b) by 610 days.

(21) Appl. No.: 09/742,372

(22) Filed: Dec. 22, 2000

(65) Prior Publication Data

US 2002/0083370 A1 Jun. 27, 2002

(51) Int. Cl.[7] .............................................. G06F 11/00
(52) U.S. Cl. ......................... 714/30; 714/36; 714/733
(58) Field of Search .............................. 714/30, 36, 43, 714/720, 733; 713/2

(56) References Cited

U.S. PATENT DOCUMENTS

| | | | | | |
|---|---|---|---|---|---|
| 4,455,654 A | * | 6/1984 | Bhaskar et al. | ............... | 714/28 |
| 4,726,024 A | * | 2/1988 | Guziak et al. | ................ | 714/24 |
| 5,327,531 A | * | 7/1994 | Bealkowski et al. | ........... | 714/6 |
| 5,379,342 A | * | 1/1995 | Arnold et al. | ................. | 380/2 |
| 5,513,188 A | * | 4/1996 | Parker et al. | ............... | 714/727 |
| 5,602,989 A | * | 2/1997 | Aria | ............................. | 714/43 |
| 5,835,695 A | * | 11/1998 | Noll | ............................... | 714/6 |
| 6,035,420 A | * | 3/2000 | Liu et al. | ....................... | 714/25 |
| 6,061,811 A | * | 5/2000 | Bondi et al. | .................. | 714/30 |
| 6,070,255 A | * | 5/2000 | Dell et al. | .................... | 714/48 |
| 6,363,492 B1 | * | 3/2002 | James et al. | ................... | 714/1 |
| 2002/0083370 A1 | * | 6/2002 | Li | ............................... | 714/37 |

\* cited by examiner

Primary Examiner—Robert Beausoliel
Assistant Examiner—Bryce P. Bonzo
(74) Attorney, Agent, or Firm—Pillsbury Winthrop LLP

(57) ABSTRACT

A system and method is provided for detecting defects in an embedded architecture or micro-processor based system. A look-up table, located with in a programmable logic device, is accessed to obtain a value for a particular byte of a predetermined data pattern. The predetermined data pattern is associated with data from a bus coupled to the programmable logic device. The accessed value of the predetermined data pattern is compared to data that is received by the programmable logic device from a memory coupled to the programmable logic device via the bus. An alarm mechanism, to indicate an improper data comparison, is triggered based upon the comparison of the predetermined data pattern and the data received from the memory.

21 Claims, 4 Drawing Sheets

| BYTE | PATTERN |
|---|---|
| 17 | 00000001 |
| 18 | 00000010 |
| 19 | 00000100 |
| 20 | 00001000 |
| 21 | 00010000 |
| 22 | 00100000 |
| 23 | 01000000 |
| 24 | 10000000 |

FIG.3

INEXPENSIVE METHOD FOR DIAGNOSING MANUFACTURING DEFECTS IN AN EMBEDDED SYSTEM

FIELD OF THE INVENTION

The present invention, in certain respects, relates to manufacturing defects in a microprocessor-based system. In other respects, the present invention relates to a method of diagnosing and isolating microprocessor circuitry problems.

BACKGROUND

As electronic components are designed smaller and smaller, these components include multiple leads having tighter pitches, which in turn leads to more manufacturing defects in the components. In a microprocessor-based system, it is necessary to rely on the processor and its associated components to work properly. When such a system is able to boot, i.e., to load an operating system into the system's main memory or random access memory, a diagnostic program can be run to isolate any problems. However, the ability to run the diagnostic program is dependent upon the system being able to boot. If the system cannot boot, then a troubleshooter, e.g., a technician, must go through the painstaking task of determining the source of the boot failure.

BRIEF DESCRIPTION OF THE DRAWINGS

The invention is further described in the detailed description which follows, by reference to the noted drawings by way of non-limiting exemplary embodiments, in which like reference numerals represent similar parts throughout the several views of the drawings, and wherein:

FIG. 3 illustrates the values of a predetermined data pattern in an exemplary embodiment of the invention.

DETAILED DESCRIPTION

Figure 1:
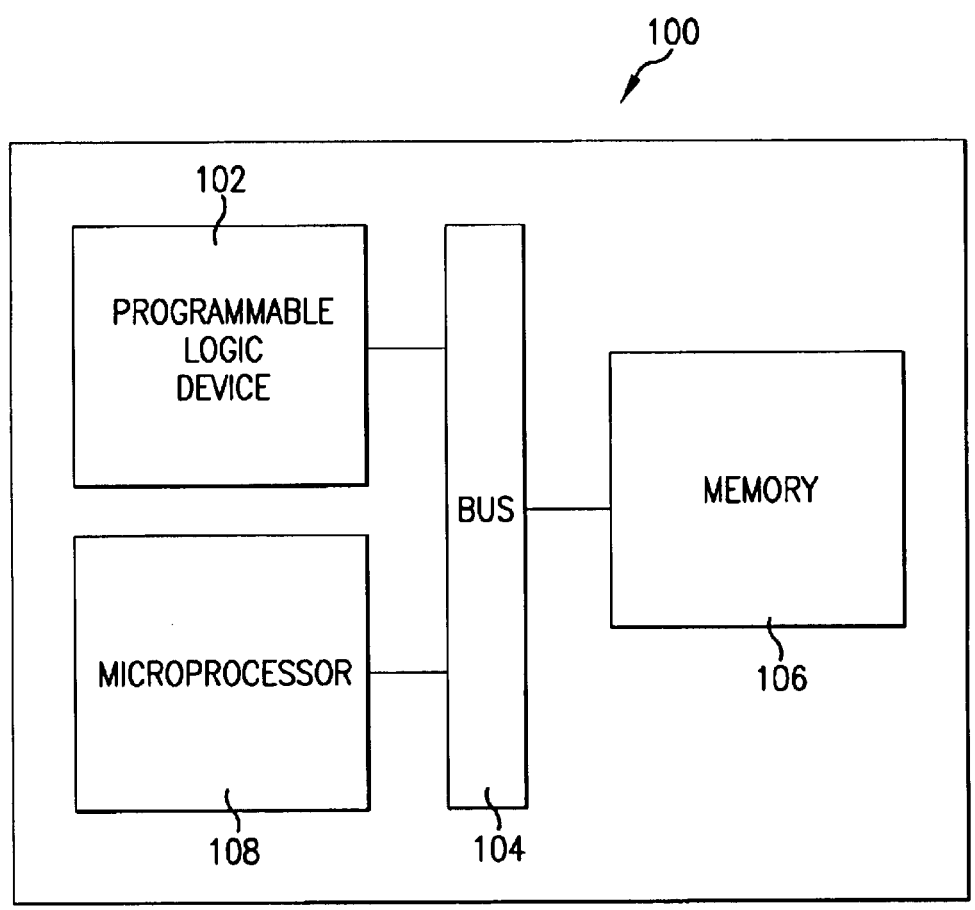
FIG. 1 illustrates an exemplary embodiment of the invention.

Exemplary embodiments of the invention provide an efficient and effective way to isolate and diagnose malfunctioning components in a computer system such as, for example, an embedded system. An embedded system is a computer system that cannot be programmed by a user because it is preprogrammed for a specific task and embedded within the equipment that it serves. The embedded system includes hardware and software that form a component of a larger system, and is expected to function without human intervention. The software may include an operating system, but is often simple enough to be written as a single program.

Exemplary embodiments of the invention may also provide a way to troubleshoot defects that are associated with microprocessor-based systems without having to rely upon the system being successfully booted. A common cause of failure of microprocessor-based systems that cannot boot is a problem associated with buses, e.g., data paths that interconnect the microprocessor with attachments to a motherboard in expansion slots (e.g., hard disk drives, CD-ROM drives, graphics adapters, etc.). A single fault with one of the address data bus bits can prevent the microprocessor from executing the proper sequence of instructions to allow the system to boot and subsequently run a diagnostic program. These faults may be the result of shorted or open signals. Locating these types of faults are difficult and requires sophisticated equipment.

Most modern microprocessor-based systems utilize instruction caches to boost the performance of their pipelined architectures. Usually on power-up, the instruction cache is minimally filled with data from sequential locations. The processor does not actually use all the fetched data because the instruction cache logic does not know where to fetch the next instruction that is to be executed until after the first instruction has been executed. For example, in the case of a x86-type processor such as the Pentium™ II, sixteen (16) bytes are fetched from the upper sixteen bytes of Read Only Memory (ROM) space, and then another sixteen bytes are fetched from directly below. The first five (5) bytes typically contain a long-jump instruction followed by two, sixteen (16) bit operands (the segment and offset addresses). The last eleven (11) bytes, as implemented, for example, in an IBM PC architecture, contain data used by the basic input-output system (BIOS).

When a computer system is turned on, the BIOS stored in the system's ROM chip is activated and takes control. The BIOS first performs a "power-on self test" (POTS) to ensure that all the computer's components are operational. Subsequently, the BIOS's boot program looks for the special boot files that will actually load the operation system from the hard disk. After identifying the drive where these boot files are located, the BIOS looks for the first sector (a 512-byte area) and copies information from it into specific locations in Random Access Memory (RAM). This information is known as the boot record.

The BIOS then loads the boot record into a specific place in the RAM. The boot record contains a program that the BIOS branches to, giving the boot record control of the computer system. The boot record loads the initial system file into the RAM from the diskette or hard disk. The initial file then loads the rest of the operating system into the RAM. The initial file also loads a system file that knows how to work with the BIOS. One of the first operating system files that is loaded is one that tells which specific applications or commands the user wants to have included or performed as part of the boot process, e.g., AUTOEXEC.BAT or WIN.INI.

After all operating system files have been loaded, the operating system is given control of the computer and performs requested initial commands. The operating system then waits for a first interactive user input. The sixteen (16) bytes, i.e. bytes 17-32, located below the initial sixteen (16) bytes of ROM space are fetched by the instruction cache on power-up are the "end of code," which means that, unless the BIOS is packed down to the last byte, the lower sixteen (16) bytes could contain any type of data.

Accordingly, in the invention a programmable logic device is utilized on a motherboard to "read" or monitor the lower sixteen (16) bytes of ROM space. FIG. 1 illustrates an exemplary embodiment of the invention in which a motherboard 100 of a system for detecting defects in an embedded architecture is shown. The illustrated motherboard 100 includes a programmable logic device 102, a microprocessor 108, a memory 106 and a bus 104. In the motherboard 100, the programmable logic device 102, memory 106 and microprocessor 108 are coupled to and communicate and cooperate via the bus 104. Memory 106 is a read-only memory (ROM) which is "built-in" computer memory containing data that normally can only be read, and not written to. ROM contains the programming that allows the computer to be "booted up" or regenerated each time the computer is turned on. In the invention, memory 106 stores a program for use by microprocessor 108. The program stored in memory 106 for use by microprocessor 108 includes, for example, a basic input-output system. Data is exchanged, via bus 104, between each of the coupled devices, i.e., programmable logic device 102, memory 106 and microprocessor 108.

Figure 2:
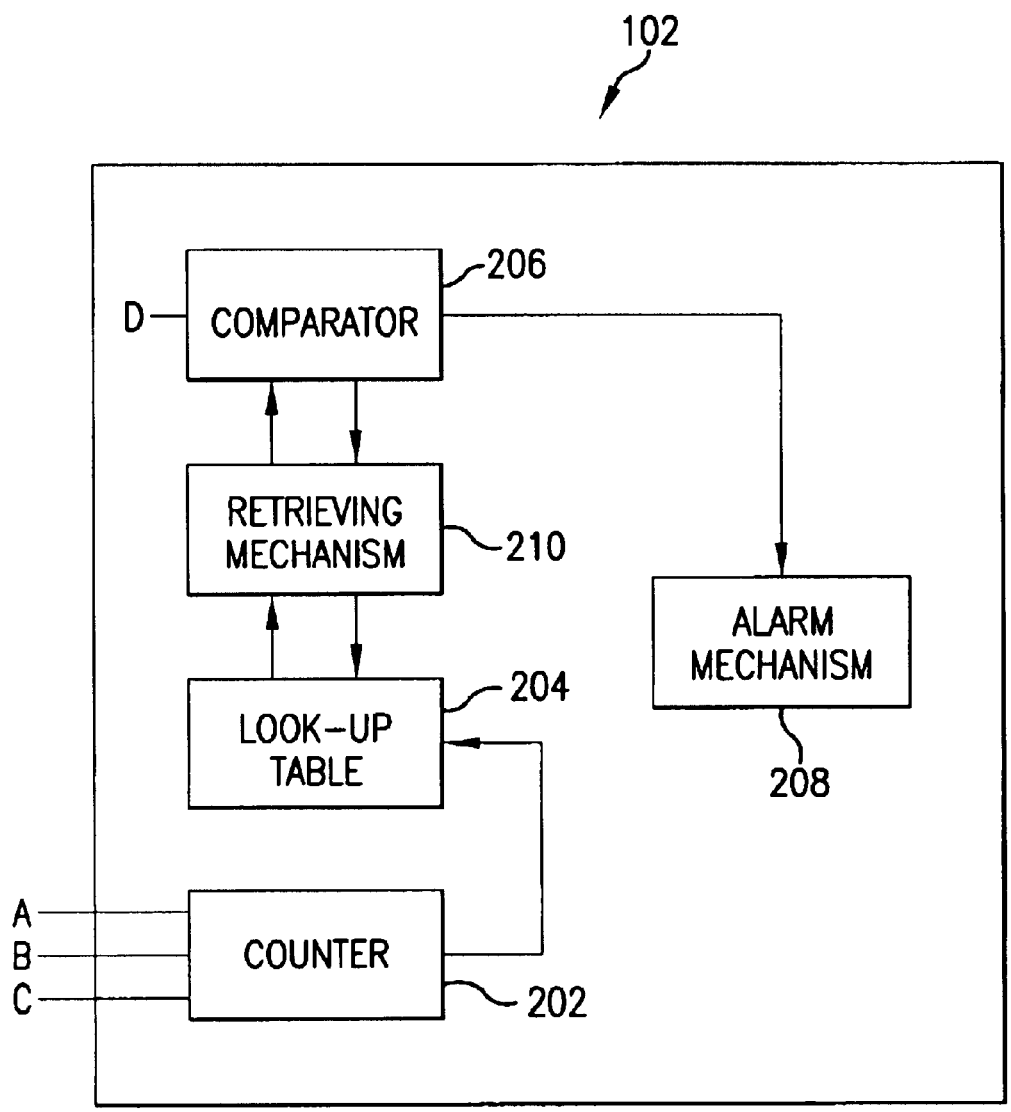
FIG. 2 illustrates a configuration of a programmable logic device in an exemplary embodiment of the invention.

FIG. 2 illustrates a configuration of the programmable logic device 102, of FIG. 1, in an exemplary embodiment of the invention. The programmable logic device 102, may be implemented using, for example, an Altera chip, model number EPM7128AETC. The programmable logic device 102 utilizes the lower sixteen (16) bytes of ROM in memory 106 and includes a counter 202, a look-up table 204, a retrieving mechanism 210, a comparator 206 and an alarm mechanism 208.

Counter 202 maintains a status of the bytes that need to be checked during a diagnostic analysis of an embedded architecture. For example, the lower sixteen (16) bytes of ROM space, bytes 17-32. Counter 202 is configured to receive, input signals from the memory 106 and an instruction cache of the microprocessor 108. In the configuration of FIG. 2, input signals A, B and C include a chip select signal, a memory read signal, and a reset signal. A chip select signal indicates that information has been read from the BIOS ROM in memory 106. The memory read signal is a signal used to determine when the memory 106 has been accessed; and the reset signal is a signal to indicate the need to reset or restart.

Look-up table 204 stores values of a predetermined data pattern. The look-up table 204 is configured so as to permit access to the stored values of the predetermined data pattern. The predetermined data pattern includes data associated with, for example, a walking-ones test. A walking-ones test utilizes data that includes a plurality of bytes in which each byte has a single enabled bit, and each byte has a different enabled bit so that the plurality of bytes have different values. FIG. 3 illustrates the values of a predetermined data pattern in an exemplary embodiment of the invention when a walking-ones test is utilized. For example, in the $17^{th}$ byte, the right most bit is enabled while the remaining bits to the left are not enabled. In each of the remaining bytes 18-24, the enabled bit, 1, walks or marches along the data words.

The retrieving mechanism 210 is configured to retrieve the stored values of the predetermined data pattern from look-up table 204. The retrieved values from look-up table 204 are then forwarded to comparator 206.

Comparator 206 is configured to compare the values of the predetermined data pattern retrieved from look-up table 204 by the retrieving mechanism 210 with data received from the memory 106 via an input D from the bus 104. Input D contains actual data values that are read from the BIOS ROM in memory 106.

Alarm mechanism 208 is configured to indicate an inconsistency resulting from a data comparison by comparator 206 between the retrieved value of the predetermined data pattern from look-up table 204 and the data of input D. The alarm mechanism 208 may be coupled to, for example, a light emitting diode or audio alarm to indicate the actual fault point. As an example, if two bits are tied together from a manufacturing defect, then one of the bytes that will be read will contain more than one enabled bit in its sequence.

Therefore, the value of this byte that is input D of comparator 206 will not match the predetermined data pattern for the corresponding byte value stored in look-up table 204. The alarm mechanism 208 would then initiate an alarm that would indicate the byte in which the error occurred. For example, the alarm mechanism 208 may initiate the lighting of a light emitting diode or an audio alarm to indicate the presence or location of an inconsistency.

Figure 4:
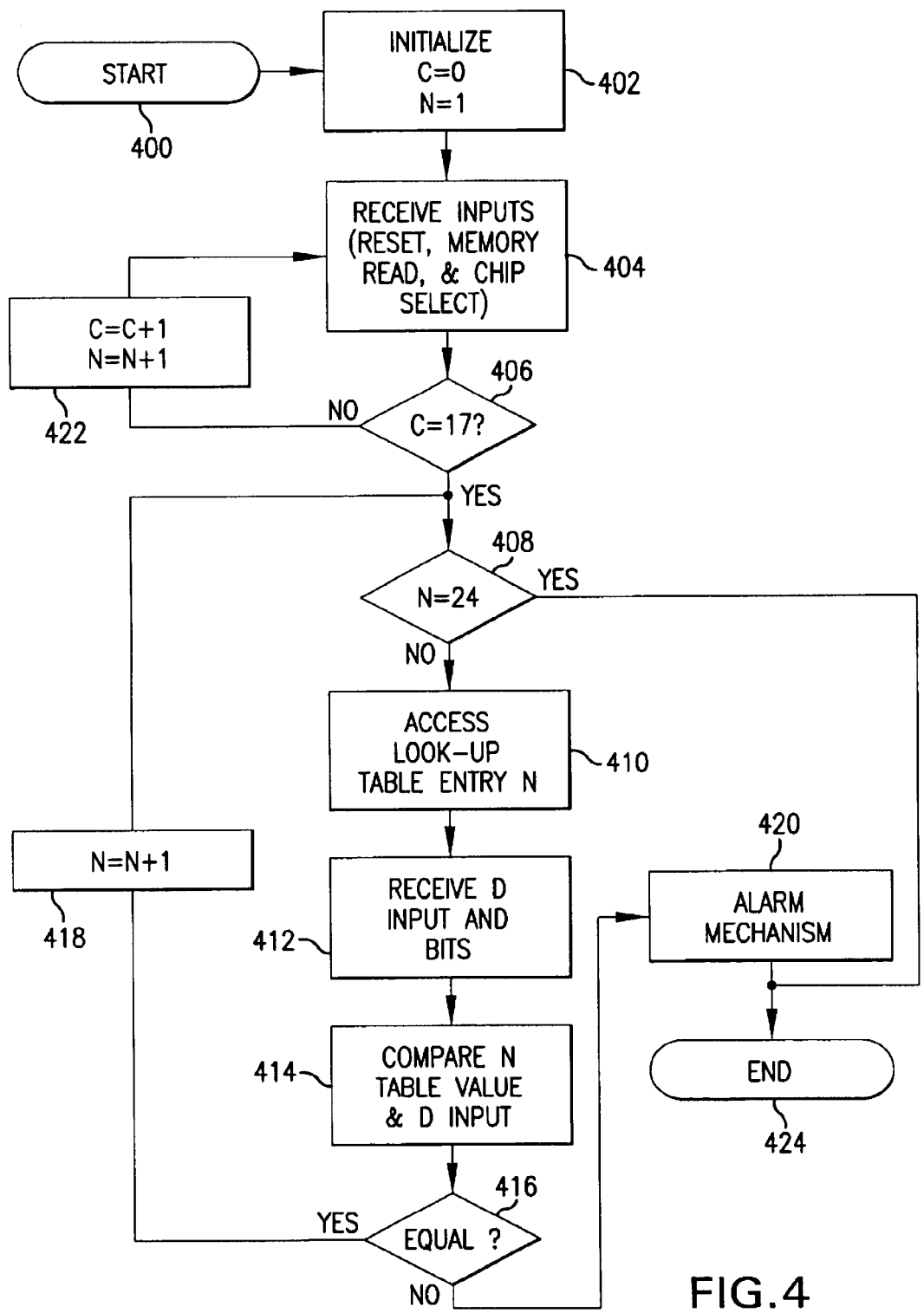
FIG. 4 is an illustrative flow chart for use in explaining a process designed in accordance with an exemplary embodiment of the invention.

FIG. 4 is an illustrative flow chart for use in explaining a process designed in accordance with an exemplary embodiment of the invention. The process begins at 400 and control proceeds to 402. At 402, the counters are initialized at C=0 and N=1. C is the value of the bytes. N is the value of the bytes of the lower ROM space that are to be "read" or monitored. In this embodiment, the first eight (8) bytes of the lower sixteen (16) bytes are used to compare with the predetermined data pattern. Therefore, the N values of interest are N=17-24.

Control then proceeds to 404, at which the reset, memory read, and chip select signals are received at the counter.

Control then proceeds to 406, at which, a determination is made whether the byte counter, C, is equal to the first value of interest, e.g., seventeen (17). If C does not equal 17, then control proceeds to 422 at which the byte counters C and N are incremented. Control then returns to 404, at which the input signals are again received. If, at 406, it is determined that C does equal seventeen (17), then control proceeds to 408, at which the present value of the N counter is determined. If N=24, then the last byte of interest has been checked, and control proceeds to 424, at which the process ends.

If N does not equal twenty-four (24), then control proceeds to 410, at which a look-up table is accessed to obtain the predetermined data pattern value for N. Control then proceeds to 412, at which the data and information from the BIOS ROM is received. Control then proceeds to 414, at which a comparison is performed between the N value of the predetermined data pattern and the data received at input D. Control then proceeds to 416, at which it is determined whether the compared values of the predetermined data pattern and data received at input D are equal. If the compared values are equal, then control proceeds to 418, at which the N counter is incremented and each remaining byte is checked until N=24. If the compared values are not equal, control proceeds to 420, at which an alarm is generated to indicate an inconsistency resulting from the comparison of the predetermined data pattern and the data received from the memory. Once a single alarm has been generated, then enough information has been read to determine that there is a problem and control proceeds to 424, at which the diagnostic analysis process ends.

While the invention has been described with reference to certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed is:

1. A system for detecting defects in an embedded architecture, the system comprising:

a programmable logic device configured to be coupled to a bus and including a look-up table containing a predetermined data pattern associated with data on the bus;

a memory configured to be coupled to the programmable logic device via the bus, the memory storing a program for use by a microprocessor coupled to the buss and a counter configured to be electronically coupled to the memory and electronically coupled to the look-up table, wherein the counter maintains a status of a plurality of bytes to be checked during a diagnostic analysis, wherein, the look-up table is configured to be accessed to compare the predetermined data pattern with data received from the memory via the bus.

2. The system of claim 1, wherein the programmable logic device receives input signals from the bus, the input signals comprising:

a chip select signal;

a memory read signal; and a reset signal.

3. The system of claim 1, wherein the program stored in the memory for use by the microprocessor is a basic input-output system.

4. A system for detecting defects in an embedded architecture, the system comprising:

a programmable logic device configured to be coupled to a bus and including a look-up table containing a predetermined data pattern associated with data on the bus;

a memory configured to be coupled to the programmable logic device via the bus, the memory storing a program for use by a microprocessor coupled to the bus;

a counter configured to receive the input signals from the memory and an instruction cache of the microprocessor and maintain a status of bytes to check during a diagnostic analysis of the embedded architecture a retrieving portion configured to retrieve values of the predetermined data pattern from the look-up table;

a comparator configured to compare the retrieved values from the look-up table with the data received from the memory; and an alarm mechanism configured to indicate an improper data pattern comparison at the comparator, wherein, the look-up table is configured to be accessed to compare the predetermined data pattern with data received from the memory via the bus.

5. The system of claim 4, wherein the alarm mechanism is coupled to a light emitting diode.

6. A system for detecting defects in an embedded architecture, the system comprising:

a programmable logic device configured to be coupled to a bus and including a look-up table containing a predetermined data pattern associated with data on the bus;

a memory configured to be coupled to the programmable logic device via the bus, the memory storing a program for use by a microprocessor coupled to the bus;

wherein, the look-up table is configured to be accessed to compare the predetermined data pattern with data received from the memory via the bus, and wherein the predetermined data pattern includes data associated with a walking ones test.

7. The system of claim 6, wherein the walking ones test utilizes data including a plurality of bytes, each byte having a single enabled bit, wherein each byte includes a different enabled bit.

8. A method for detecting defects in an embedded architecture, the method comprising:

accessing a counter electronically coupled to a look-up table, included in a programmable logic device, and to a memory, wherein the counter maintains a status of a plurality of bytes to be checked during a diagnostic analysis;

accessing the look-up table included in a programmable logic device, the look-up table containing a predetermined data pattern associated with data on a bus coupled to the programmable logic device; and receiving data at the programmable logic device from the memory via the bus; and comparing the predetermined data pattern with the data received from the memory.

9. The method of claim 8, further comprising triggering an alarm mechanism to indicate an improper data comparison based on the comparison of the predetermined data pattern and the data received from the memory.

10. The method of claim 9, wherein the alarm mechanism is coupled to a light emitting diode.

11. The method of claim 8, further comprising receiving input signals at a counter of the programmable logic, via the bus, from an instruction cache in a microprocessor.

12. The method of claim 11, the input signals include:

a chip select signal;

a memory read signal; and a reset signal.

13. A method for detecting defects in an embedded architecture, the method comprising:

accessing a look-up table included in a programmable logic device, the look-up table containing a predetermined data pattern associated with data on a bus coupled to the programmable logic device;

receiving data at the programmable logic device from a memory via the and comparing the predetermined data pattern with the data received from the memory, wherein the predetermined data pattern includes data associated with a walking ones test.

14. The method of claim 13, wherein the walking ones test utilizes data including a plurality of bytes, each byte having a single enabled bit, wherein each byte includes a different enabled bit.

15. A computer-readable medium encoded with a program for detecting defects in a embedded architecture, the program comprising:

accessing a counter electronically coupled to a look-up table, included in a programmable logic device, and to a memory, wherein the counter maintains a status of a plurality of bytes to be checked during a diagnostic analysis:

accessing the look-up table, the look-up table containing a predetermined data pattern associated with data on a bus coupled to the programmable logic device; and receiving data at the programmable logic device from the memory via the bus; and comparing the predetermined data pattern with the data received from the memory.

16. The computer-readable medium of claim 15, the program further comprising triggering an alarm mechanism to indicate an improper data comparison based on the comparison of the predetermined data pattern and the data received from the memory.

17. The computer-readable medium of claim 16, wherein the alarm mechanism is coupled to a light emitting diode.

18. The computer-readable medium of claim 15, the program further comprising receiving input signals at a counter of the programmable logic device, via the bus, from an instruction cache in a microprocessor.

19. The method of claim 18, wherein the input signals include:

a chip select signal;

a memory read signal; and a reset signal.

20. A computer-readable medium encoded with a program for detecting defects in a embedded architecture, the program comprising:

accessing a look-up table included in a programmable logic device, the look-up table containing a predetermined data pattern associated with data on a bus coupled to the programmable logic device; and receiving data at the programmable logic device from a memory via the bus; and comparing the predetermined data pattern with the data received from the memory, wherein the predetermined data pattern includes data associated with a walking ones test.

21. The computer-readable medium of claim 20, wherein the walking ones test utilizes data including a plurality of bytes, each byte having a single enabled bit, wherein each byte includes a different enabled bit.

* * * * *

UNITED STATES PATENT AND TRADEMARK OFFICE
CERTIFICATE OF CORRECTION

PATENT NO. : 6,785,846 B2
DATED : August 31, 2004
INVENTOR(S) : Ming Y. Li

It is certified that error appears in the above-identified patent and that said Letters Patent is hereby corrected as shown below:

Column 6,
Line 34, insert -- bus; -- following "the".

Signed and Sealed this

Twenty-sixth Day of October, 2004

JON W. DUDAS
*Director of the United States Patent and Trademark Office*